United States Patent [19]

Weber et al.

[11] 4,413,764

[45] Nov. 8, 1983

[54] GUIDE FOR TRACTOR FEED FOR PAPER WEBS IN OFFICE MACHINE

[75] Inventors: Wendelin Weber, Siegen; Manfred Rosenthal, Kirchen, both of Fed. Rep. of Germany

[73] Assignee: U. S. Philips Corporation, New York, N.Y.

[21] Appl. No.: 301,568

[22] Filed: Sep. 14, 1981

[30] Foreign Application Priority Data

Sep. 29, 1980 [DE] Fed. Rep. of Germany ....... 3036642

[51] Int. Cl.[3] ........................ B65H 17/34; G03B 1/30

[52] U.S. Cl. ........................................ 226/170; 226/74

[58] Field of Search ................... 226/170, 171, 78, 74, 226/75; 271/34

[56] References Cited

U.S. PATENT DOCUMENTS 2,302,704 11/1942 Mabon .......................... 226/75 E X 2,313,888 3/1943 Otis .............................. 226/75 E X

FOREIGN PATENT DOCUMENTS 2062806 12/1970 Fed. Rep. of Germany ........ 226/74

2629382 6/1976 Fed. Rep. of Germany ........ 226/74

OTHER PUBLICATIONS

IBM Technical Disclosure Bulletin, vol. 22, No. 6, (11/79), pp. 2171–2172.

*Primary Examiner*—Stanley N. Gilreath
*Assistant Examiner*—Dao Van Huynh
*Attorney, Agent, or Firm*—David R. Treacy

[57] ABSTRACT

A paper web in an office machine is transported from the one side of a transporter (tractor) comprising a transport chain to the printing backing and back again on the other side of the transporter. In the case of multi-layer paper webs, notably webs comprising more than four layers, an increasingly larger wave of the paper web tends to in front of the printing backing. In order to avoid such waves, the associated transporters comprise guide pieces for the paperweb which extend from the tractor to the vicinity of the zone of contact between the paper web and the printing backing and whose surface is situated at least substantially in the plane tangential to the printing backing at this zone of contact.

10 Claims, 3 Drawing Figures

GUIDE FOR TRACTOR FEED FOR PAPER WEBS IN OFFICE MACHINE

BACKGROUND OF THE INVENTION

The invention relates to a tractor feed device for paper webs, having two tractors per paper web, which are journalled on two associated shafts and which can be driven by at least one shaft. Each tractor comprises an endless transport chain with pins and deflectable retaining flaps on their longitudinal sides, the paper web being fed by one longitudinal side of the associated tractors to the printing backing around which it is guided after which it is discharged along the other longitudinal side of the associated tractors. A pivotable guide piece is arranged on the end face of the associated tractors which faces the printing backing, to engage paper web upstream of the printing backing, viewed in the transport direction.

A transport device of this kind is known from German Offenlegungsschrift No. 20 62 806. Because the paper web is guided on the tractor on both sides, proper guiding through 180° about a roller used as the printing backing is achieved. Because the paper web can expand and shrink in accordance with the air humidity, the tractor comprises a pivotable guide piece which ensures that the paper always contacts the printing roller with approximately the same tension.

During the transport and the threading of paper webs, notably in the printing device of an accounting machine, however, problems are encountered in that on the one hand the introduction into the lower or supply side of the tractors is difficult and in that on the other hand, in the case of multi-layer paper webs, the inner webs form an increasingly larger wave in front of (upstream of) the printing roller which disturbs the so-called crimp lock adhesion that fastens the individual webs together along their perforated edge zones.

However, once the adhesion has been disturbed, the webs shift with respect to each other to such an extent that the transport perforations of the individual paper layers no longer register and the pins of the endless chain cannot properly penetrate the perforations any longer. Smooth guiding of the paper webs is then no longer possible.

SUMMARY OF THE INVENTION

The invention has for its object to construct a transport device of the kind set forth so that shifting of the paper layers of the paper web with respect to each other is substantially avoided and that the paper web can be simply and smoothly inserted into the tractors.

This object is achieved in that the guide pieces extend from the tractor as far as the vicinity of the zone in which the paper web first contacts the printing backing, the surface of the guide pieces which is contacted by the paper web being situated in or substantially in a plane tangential to the backing at which the zone of first contact between the paper web and the printing backing.

In order to compensate for manufacturing tolerances, the guide pieces are preferably journalled on the associated tractors in a hinged manner and have a front portion arranged to bear on the printing backing. To this end, the relevant guide piece may be provided with a sliding member, for example, a roller or a felt cover on its front portion.

In order to achieve transport without shift of paper layers, it is particularly advantageous to slightly curve the surfaces of the guide pieces on which the paper web slides, only the surface of the front portion of the guide then being situated in the tangential plane of first contact between the paper web and the printing backing.

A straight, flat surface of the guide pieces which is completely situated that tangential plane offers a substantial improvement of the guiding of the paper web with respect to the known arrangements, but is less attractive than a curved surface with respect both to performance and cost. The guiding of a paper web across a flat surface is extremely difficult. On the one hand, an accurate flat surface can be made only with difficulty, and on the other hand the guiding of the paper web across the flat surface with a tension which is uniform everywhere cannot be achieved, or is achievable only with a major effort. The tension will be larger at the beginning and at the end of the surface than between these two zones, so that waves can be formed in the paper web even though they remain comparatively small.

In order to facilitate the insertion of the paper webs in the lower or supply side of the two associated tractors, the tractors in a further embodiment in accordance with the invention are pivotable about one of their two shafts, the guide pieces then sliding across the printing backing during the pivoting of the tractors in order to reach a stable position.

The guide pieces are returned to the position in which they bear on the printing backing by an arrangement whereby, during the return pivoting movement of the tractors they abut against a stationary abutment, so that they are pivoted against the force of an associated over-center spring which then produces the bearing force of the guide piece on the printing backing.

A particularly easy insertion of the paper webs in the lower side of the tractors is obtained when the tractors are pivoted about the rear shaft, which is remote from the printing backing. The front shaft is then journalled to be pivoted about and on the rear shaft.

The invention will be described in detail hereinafter with reference to an embodiment.

DESCRIPTION OF THE PREFERRED EMBODIMENT

Figure 1:
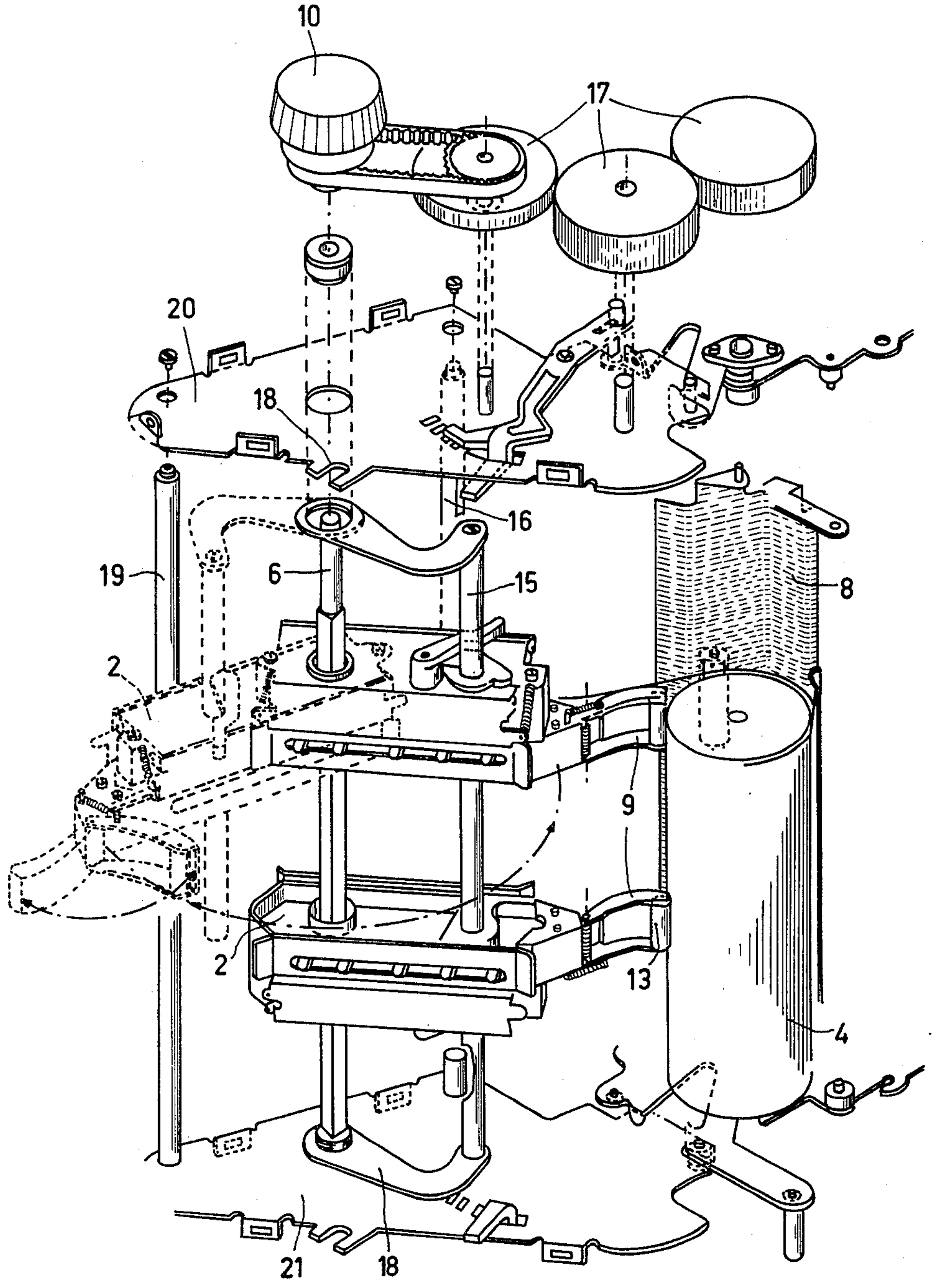
FIG. 1 is a perspective front view of the transport device in accordance with the invention.

The transport device shown in the Figures comprises two side portions 20 and 21 which are connected to an office machine frame in known manner by means of lugs. The two side portions are rigidly interconnected by means of a rod 16 and an abutment rod 19. Moreover, a connection plate 22 which is not visible in FIG. 1 is also connected to these side portions 20 and 21. A rear shaft 6 is journalled in the side portions 20 and 21. This shaft is driven by an electric motor (not shown) via a drive 17 in synchronism with a printing backing 4 which is constructed as a roller. However, it can alternatively be manually turned by means of a handwheel 10. For the insertion of a paper web, the electric motor is not switched on, so that the paper is advanced by hand.

On the rear shaft 6 two tractors 2 are arranged so that endless transport chains arranged in the tractors are moved thereby. These transport chains comprise pins 1 and 1*a* which engage in the perforations at the edge of the paper web, thus transporting the web. On the rear shaft 6, moreover, a front shaft 15 is pivotably journalled by connection links 18. The tractors can thus be pivoted about the rear shaft 6, as denoted for one tractor in FIG. 1. In the operating position, the tractors 2 bear on the rod 16, while in the pivoted position they bear against the abutment rod 19.

Figure 2:
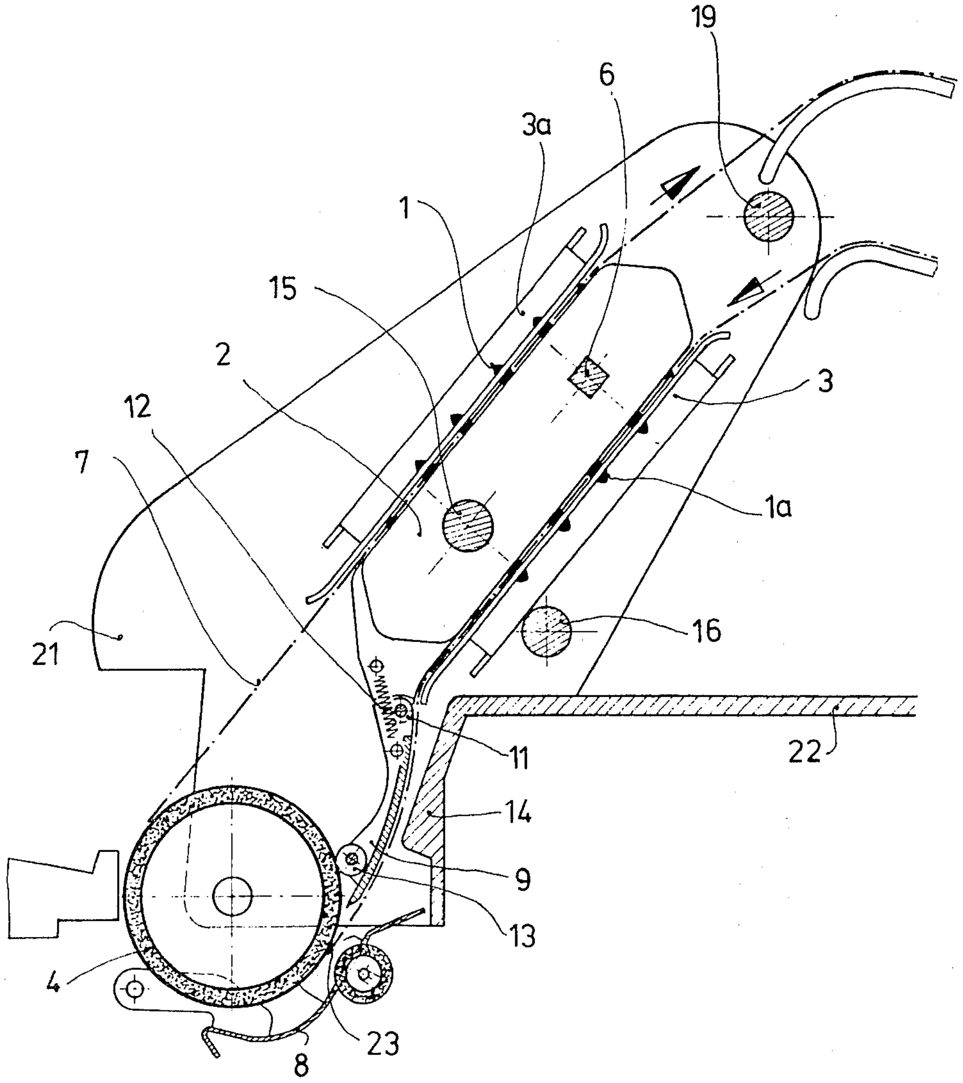
FIG. 2 is a sectional side elevation of the device in the operating condition.
Figure 3:
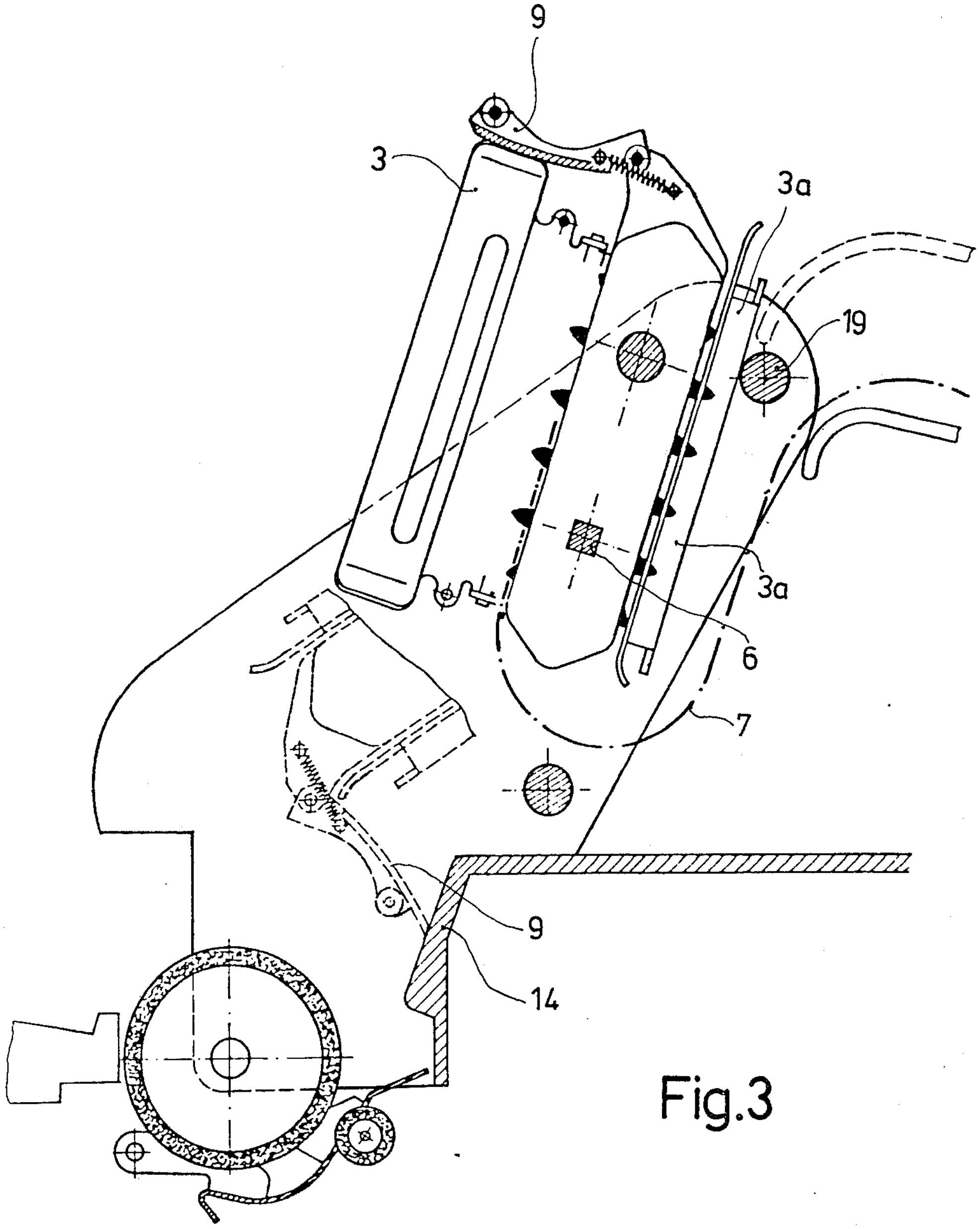
FIG. 3 is a sectional side elevation of the device with the tractors in the pivoted position.

The pivoted position of the tractors 2 is shown in FIG. 3. To permit insertion of a paper web 7 into the lower side of the tractors, their retaining flaps 3 are laterally deflected. Because the lower side of the tractors 2 then faces the operator, the insertion of the paper web 7 is simple and easy. After the insertion of the paper web, the retaining flaps 3 are returned to their original position and the tractors are pivoted back to their operating position. This operating position is shown in FIG. 2. Subsequently, the paper web 7 is introduced into a pressure device 8 with a pressure roller and is guided around a printing backing or roller 4. Than the retaining flaps 3*a* are pivoted upwards, so that the paper web 7 with its perforations can be arranged in the pins 1 of the transport chains in known manner. Returning the retaining flaps 3*a* to their original position completes the insertion of the paper web 7 to form a loop around the printing backing.

In the case of multilayer paper webs 7, the separate webs are attached at the area of the perforations. Because the paper web 7 is guided 180° around the roller in such a transport guide, the webs which are situated near the roller 4 are guided on a smaller radius of curvature than the outer layers of the paper web 7. During the transport of a multilayer paper web, notably a web comprising more than four layers, a different paper tension occurs after a short period of time in front of the printing backing 4. The outer paper layer passes around the backing 4 with the required tension, while the inner layers are backwashed by the printing backing and form a large wave in front of the printing backing which tends to grow in the case of long paper webs, and which disturbs the so-called crimp-lock adhesion. The individual paper layers are then shifted ever further and ultimately cause disturbances in the transport of the paper web 7. In order to avoid this phenomenon, the tractors 2 comprise guide pieces 9 which are arranged to extend as far as possible into the zone in which the paper web 7 contacts the roller 4. The guide pieces 9 may be rigidly connected to the tractors 2. However, if the tractors 2 have to be pivoted about the rear shaft 6, they cannot do so with fixed guide pieces 9, because the roller 4 is situated within the pivoting zone. One solution to this problem consists of shifting either the printing roller 4 or the tractors 2 shifted in the plane formed thereby. The embodiment shown illustrates a preferred arrangement in which the guide pieces 9 are pivotably connected to the tractors 2. The pivot axis 11 at the same time serves as a dead center for an over-center spring 12.

When the tractors 2 are pivoted, the guide pieces 9 slide across the surface of the roller 4. In order to prevent damaging of the roller 4, a roller 13 is arranged at the free end of the guide pieces 9. Instead of this roller 13, other sliding members can also be used. During the pivoting motion of the tractors, the spring 12 is expanded until the connecting line of its connection points passes the pivot axis 11 (the dead center position). Subsequently, the guide piece 9 is moved to and retained in its pivoted stable position by the force of the spring 12. This stable position is chosen so that the free end of the guide piece 9 is no longer obstructed by the roller 4.

When the tractors 2 are returned to their initial position after the insertion of the paper web 7, the guide pieces 9 are still in their pivoted position or, when they had to be pivoted back to their operating position in order to avoid obstruction of the pivoting of the retaining flaps 3, the free end of the guide pieces 9 is arranged to abut against an abutment 14 of the connection plate 22 just before the operating position of the tractors is reached. This situation is denoted by broken lines in FIG. 3. The shape of the abutment 14 should be chosen so that the front edge of the free end of the guide piece 9 engages at an acute angle. Thus, when the tractors 2 are pivoted further, the guide piece 9 slides across the surface of the abutment 14 until the spring 12 has passed its dead center position again. The spring 12 resiliently holds the guide piece 9 against the roller 4. Because the spring 12 need not exert large forces, it may be proportioned so that the piece 9 bears only lightly on the roller 4.

In the embodiment chosen, the guide piece 9 is shaped as a bracket adapted to the width of the tractors. However, other shapes are also feasible.

It is particularly attractive for the guide piece 9 to have a curved surface across which the paper web 7 slides. The other paper layer, arriving under tension, thus exerts a pressure which remains uniform across the entire sliding surface, so that the inner paper layers cannot form a large wave. However, if the surface of the guide piece 9 is constructed to be straight, the paper web will exert different pressures on this surface which are larger at the end and the beginning of the surface than in the zone therebetween. Consequently, many small waves can occur in the paper web across the sliding surface; however, these waves cannot disturb the adhesion of the individual paper layers.

What is claimed is:

1. A tractor feed device for paper webs, comprising two associated shafts, two tractors each journalled on said shafts and arranged to be driven by at least a first one of said shafts; each tractor comprising an endless transport chain having pins and arranged to pass about said shafts so as to define two longitudinal sides, and a pair of deflectable retaining flaps on the longitudinal sides of the tractor; said device further comprising a pivotable guide piece arranged adjacent an end face of a tractor, said device being adapted to feed a paper web along one longitudinal side of the tractors over said guide to a printing backing around which the web is guided, the web then being discharged along the other longitudinal side of the tractors, characterized in that said guide piece is arranged to extend from the tractor to the vicinity of a zone in which the paper web first contacts the printing backing, in that at least one said guide piece is pivoted to a respective tractor in a hinged manner, and said guide piece has a surface which contacts a paper web being so fed and which lies at a location within a loop formed by the paper web substantially in a plane tangential to the printing backing at the zone of first contact between the paper web and the printing backing.

2. A device as claimed in claim 1, especially adapted for use with a printing backing formed as a roller, characterized in that at least one said guide piece has a front portion arranged to bear resiliently on the printing backing.

3. A device as claimed in claim 2, characterized in that the guide piece comprises a sliding member arranged to engage a surface of the printing backing.

4. A device as claimed in claim 2 characterized in that said at least one guide piece has a surface across which the paper web is guided, which is slightly curved, the guide piece having a portion which faces the printing backing and is situated in said plane.

5. A device as claimed in claim 1 characterized in that said guide piece has a surface across which the paper web is guided, which is slightly curved, the guide piece having a portion which faces the printing backing and is situated in said plane.

6. A device as claimed in claim 4 or 5, characterized in that said tractors are each pivotable about one of said two shafts, from an operating position to a pivoted position, said guide piece being arranged to slide across the printing backing during pivoting motion of the tractors about said one shaft by pivoting with respect to said tractors; and said device further comprises means for pivoting said guide piece into a stable position in response to pivoting of the tractors to the pivoted position.

7. A device as claimed in claim 6, characterized in that said means comprises an over-center spring which also biases the guide piece against the printing backing when the tractors are in the operating position.

8. A device as claimed in claim 7, characterized by comprising a stationary abutment arranged to engage said at least one guide piece during a return pivoting movement of the tractors about said one shaft to the operating position, for pivoting the guide piece back from said stable position.

9. A device as claimed in claim 8, characterized in that said one shaft is the shaft which is remote from the printing backing, the other shaft being a front shaft which is pivotably arranged about said one shaft.

10. A device as claimed in claim 6, characterized in that said one shaft is the shaft which is remote from the printing backing, the other shaft being a front shaft which is pivotably arranged about said one shaft.

* * * * *